(12) United States Patent
Joboji et al.

(10) Patent No.: US 8,854,507 B2
(45) Date of Patent: Oct. 7, 2014

(54) SOLID-STATE IMAGING DEVICE

(75) Inventors: Tasuku Joboji, Hamamatsu (JP); Yukinobu Sugiyama, Hamamatsu (JP); Haruyoshi Toyoda, Hamamatsu (JP); Munenori Takumi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 280 days.

(21) Appl. No.: 13/202,999

(22) PCT Filed: Mar. 26, 2010

(86) PCT No.: PCT/JP2010/055432
§ 371 (c)(1),
(2), (4) Date: Aug. 24, 2011

(87) PCT Pub. No.: WO2010/116904
PCT Pub. Date: Oct. 14, 2010

(65) Prior Publication Data
US 2011/0304751 A1 Dec. 15, 2011

(30) Foreign Application Priority Data

Apr. 7, 2009 (JP) ................... 2009-093065

(51) Int. Cl.
*H04N 9/64* (2006.01)
*H04N 5/217* (2011.01)
*H04N 5/335* (2011.01)
*H04N 5/3745* (2011.01)
*H04N 5/361* (2011.01)
*H04N 5/378* (2011.01)
*H04N 5/365* (2011.01)

(52) U.S. Cl.
CPC ......... *H04N 5/3658* (2013.01); *H04N 5/37452* (2013.01); *H04N 5/361* (2013.01); *H04N 5/37457* (2013.01); *H04N 5/378* (2013.01); *H04N 5/3653* (2013.01)
USPC ............ 348/243; 348/241; 348/245; 348/308

(58) Field of Classification Search
USPC ......................................................... 348/243
See application file for complete search history.

(56) References Cited

U.S. PATENT DOCUMENTS 6,473,124 B1  10/2002  Panicacci et al.
6,538,695 B1  3/2003  Xiao et al.
(Continued)

FOREIGN PATENT DOCUMENTS

CN  1767598  5/2006
CN  1783957  6/2006
(Continued)

*Primary Examiner* — Twyler Haskins
*Assistant Examiner* — Quang Le
(74) *Attorney, Agent, or Firm* — Drinker Biddle & Reath LLP

(57) ABSTRACT

A solid-state imaging device 1 according to an embodiment of the invention includes: pixel units P(x, y) each of which includes a photoelectric conversion element and an amplifying unit for a pixel unit and which are two-dimensionally arranged; at least one row of optical black units Pob(x, y) each of which includes a photoelectric conversion element, an amplifying unit for a pixel unit, and a light shielding film that covers the photoelectric conversion element, the photoelectric conversion element and the amplifying unit for a pixel unit being the same as those of the pixel unit P(x, y); and at least one row of optical gray units Pog(x, y) each of which includes an amplifying unit for a pixel unit which is the same as that of the pixel unit and to which a reference voltage is input. The value of the reference voltage is less than the value of the output signal from the photoelectric conversion element in a saturated state.

1 Claim, 18 Drawing Sheets

(56) References Cited

U.S. PATENT DOCUMENTS

2006/0092482 A1    5/2006    Yano et al.
2008/0297627 A1*    12/2008    Matsuda ..................... 348/243

FOREIGN PATENT DOCUMENTS

| | | |
|---|---|---|
| JP | 10-12857 | 1/1998 |
| JP | 2002-44370 | 2/2002 |
| JP | 2003-9005 | 1/2003 |
| JP | 2005-39379 | 2/2005 |
| JP | 2005-223860 | 8/2005 |
| JP | 2006-148461 | 6/2006 |
| JP | 2006-157263 | 6/2006 |
| JP | 2007-288479 | 11/2007 |
| JP | 2008-124527 | 5/2008 |
| JP | 2008-219803 | 9/2008 |

* cited by examiner

SOLID-STATE IMAGING DEVICE

TECHNICAL FIELD

The present invention relates to a solid-state imaging device capable of improving image quality.

BACKGROUND ART

Patent Literatures 1 to 3 disclose solid-state imaging devices including an imaging area in which a plurality of pixel units is two-dimensionally arranged.

The solid-state imaging device disclosed in Patent Literature 1 is a multi-port readout solid-state imaging device including a plurality of ports (amplifying unit for output) corresponding to each column of the imaging area and is provided in order to compensate for a variation in the output read from each port between the columns at the boundary of the imaging area. In the solid-state imaging device, a reference signal is input to one column which corresponds to each port and is disposed at the boundary of the imaging area and an offset variation and a gain variation of the output signal between the ports are compensated for on the basis of the reference signal.

The solid-state imaging device disclosed in Patent Literature 2 includes an optical black cell and an optical white cell which becomes the saturation level standard on the same substrate. The solid-state imaging device determines whether an effective pixel is at the saturation level on the basis of an output signal from the optical white cell.

The solid-state imaging device disclosed in Patent Literature 3 changes the gain of the amplifying unit for output on the basis of a reset signal, which is an output from a solid-state imaging element (pixel unit) substantially in a dark state. The solid-state imaging device compensates for an offset variation and a gain variation of the output signal due to a variation in the characteristics of the solid-state imaging element on the basis of the tendency that, as the level of the reset signal of the solid-state imaging element increases, the sensitivity of the solid-state imaging element decreases.

CITATION LIST

Patent Literature

[Patent Literature 1] Japanese Unexamined Patent Application Publication No. 2003-009005
[Patent Literature 2] Japanese Unexamined Patent Application Publication No. 10-12857
[Patent Literature 3] Japanese Unexamined Patent Application Publication No. 2002-044370

SUMMARY OF INVENTION

Technical Problem

However, when an image reading process is performed for each column in the imaging area, vertical stripes are likely to occur. It is considered that the vertical stripes are caused by an offset variation and a gain variation of the output signal. It is important to compensate for the offset variation and the gain variation of the output signals between the columns at the boundary of the imaging area, as in the solid-state imaging device disclosed in Patent Literature 1.

However, in the solid-state imaging device disclosed in Patent Literature 1, the reference voltage is supplied to one column at the boundary of the imaging area. Therefore, it is considered that correction data is acquired in advance before an imaging operation and the correction data is used during the imaging operation. However, after the imaging operation starts, the temperature is changed and it is difficult to perform correction with the previously acquired correction data.

In the solid-state imaging device disclosed in Patent Literature 3, the offset and gain of the amplifying unit for output are set during a reset operation. Therefore, when the temperature is changed after the start of the imaging operation, correction is insufficiently performed. In addition, since the gain of the amplifying unit for output is indirectly set from the reset level, correction is ineffective in a portion that is not related to the reset level and the gain.

In the solid-state imaging device disclosed in Patent Literature 2, a signal for defining the dark level from the optical black cell and a signal for defining the saturation level from the optical white cell are obtained during an imaging operation. However, it is difficult to sufficient correct the gain variation with the signal for defining the dark level and the signal for defining the saturation level.

An object of the invention is to provide a solid-state imaging device capable of correcting an offset variation and a gain variation of an output signal in an imaging area in real time.

Solution to Problem

According to a first aspect of the invention, there is provided a solid-state imaging device including: pixel units each of which has a photoelectric conversion element and an amplifying unit for a pixel unit that amplifies an output signal from the photoelectric conversion element and which are two-dimensionally arranged; at least one row of optical black units each of which includes a photoelectric conversion element, an amplifying unit for a pixel unit, and a light shielding film that covers the photoelectric conversion element, the photoelectric conversion element and the amplifying unit for a pixel unit being the same as those of the pixel unit; and at least one row of optical gray units each of which includes an amplifying unit for a pixel unit which is the same as that of the pixel unit and to which a reference voltage is input. The value of the reference voltage is less than the value of the output signal from the photoelectric conversion element in a saturated state.

According to the solid-state imaging device of the first aspect, the optical black unit generates the output signal of the pixel unit in a dark state and the optical gray unit generates the output signal of the pixel unit in an intermediate state between the dark state and the saturated state. That is, the optical gray unit generates an output signal in the dynamic range of the pixel unit. At least one optical black unit and at least one optical gray unit are provided for each column. Therefore, for example, when a reading operation is sequentially performed for each column, the output signal of the pixel unit, the output signal in the dark state, and the output signal in the dynamic range are obtained for each reading operation. Therefore, it is possible to correct an offset variation and a gain variation of the output signals from a plurality of pixel units in real time.

The solid-state imaging device according to the first aspect may further include a correction circuit that corrects an output signal from the pixel unit on the basis of an output signal from the optical black unit and an output signal from the optical gray unit.

According to this structure, the correction circuit can correct the offset value of the output signal sequentially input from the pixel units so as to be constant on the basis of the output signal from the optical black unit, and correct the gain of the signal sequentially output from the pixel units so as to be constant on the basis of the two values, that is, the output signal from the optical black unit and the output signal from the optical gray unit. As a result, the output signal whose offset variation and gain variation are corrected is obtained.

According to a second aspect of the invention, there is provided a solid-state imaging device including: pixel units each of which has a photoelectric conversion element and an amplifying unit for a pixel unit that amplifies an output signal from the photoelectric conversion element and which are two-dimensionally arranged; and a plurality of rows of optical gray units each of which includes an amplifying unit for a pixel unit which is the same as that of the pixel unit and to which a reference voltage is input. A value of the reference voltage is less than a value of the output signal from the photoelectric conversion element in a saturated state and is different for each row.

According to the solid-state imaging device of the second aspect, the optical gray unit is in the intermediate state between the dark state and the saturated state and generates the output signals of the pixel units in a plurality of different intermediate states. That is, the optical gray unit generates a plurality of output signals in the dynamic range of the pixel unit. A plurality of optical gray units is disposed for each column. Therefore, for example, when a reading operation is sequentially performed for each column, the output signal of the pixel unit and a plurality of output signals in the dynamic range are obtained for each reading operation. Therefore, it is possible to correct an offset variation and a gain variation of the output signals from a plurality of pixel units.

The solid-state imaging device according to the second aspect may further include a correction circuit that corrects an output signal from the pixel unit on the basis of output signals from the plurality of rows of optical gray units.

According to this structure, the correction circuit can correct the signals sequentially output from the pixel units such that the offset value of the output signal is constant, on the basis of the output signals from a plurality of optical gray units, and can correct the signals sequentially output from the pixel units such that the gain of the output signal is constant, on the basis of the output signals from a plurality of optical gray units. As a result, it is possible to obtain the output signal whose offset variation and gain variation are corrected.

The solid-state imaging devices according to the first and second aspects may further include a variable voltage generating unit that generates the reference voltage and changes the reference voltage.

According to this structure, a plurality of different reference voltages is input to the amplifying unit for a pixel unit in the optical gray unit. Therefore, the optical gray unit can generate a plurality of output signals in the dynamic range of the pixel unit. As a result, it is possible to correct a gain variation with a plurality of correction values and thus correct the gain variation with high accuracy. In particular, even when the gain characteristics are non-linear, it is possible to correct the gain variation with multi-point correction values.

The optical gray unit may further include a capacitive element that is connected in series to an input terminal of the amplifying unit for a pixel unit, and the reference voltage may be a pulse voltage.

For example, there is a solid-state imaging device that includes a CDS (Correlated Double Sampling) circuit and removes noise on the basis of a correlated double sampling method. However, when a DC reference voltage is supplied to the optical gray unit, it is difficult for the CDS circuit to remove noise during a reset operation.

However, according to the above-mentioned structure, since a pulse voltage is supplied to the optical gray unit, the CDS circuit can remove noise during the reset operation.

In the solid-state imaging device according to the first aspect, an imaging area in which the pixel units, the optical black units, and the optical gray units are two-dimensionally arranged may be divided into m blocks (m is an integer equal to or greater than 2) in the row direction. The solid-state imaging device may further include m correction circuits that receive output signals from the m blocks in the imaging area and correct output signals from the pixel units on the basis of output signals from the optical black units and output signals from the optical gray units.

In the solid-state imaging device according to the second aspect, an imaging area in which the pixel units and the plurality of rows of optical gray units are two-dimensionally arranged may be divided into m blocks (m is an integer equal to or greater than 2) in the row direction. The solid-state imaging device may further include m correction circuits that receive output signals from the m blocks in the imaging area and correct output signals from the pixel units on the basis of output signals from the plurality of rows of optical gray units.

According to the above-mentioned structure, the m correction units perform the same correction process for each block such that the offset and gain of the output signals are constant. Therefore, it is possible to correct an offset variation and a gain variation of the output signal occurring between the blocks in real time.

Advantageous Effects of Invention

According to the invention, it is possible to correct an offset variation and a gain variation of output signals in an imaging area of a solid-state imaging device in real time.

DESCRIPTION OF EMBODIMENTS

Figure 1:
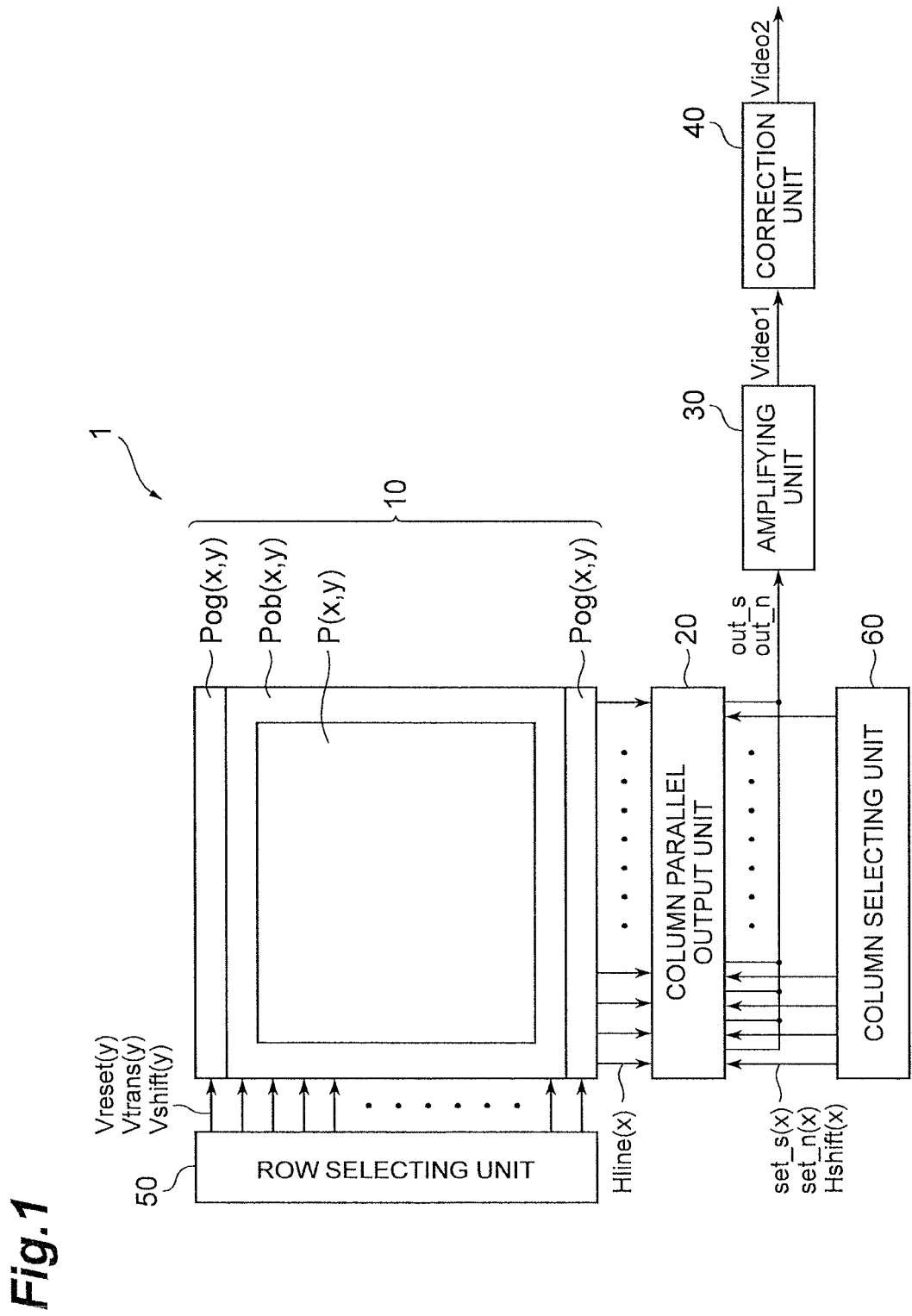
FIG. 1 is a circuit diagram illustrating a solid-state imaging device according to a first embodiment of the invention.

Hereinafter, exemplary embodiments of the invention will be described in detail with reference to the accompanying drawings. In the drawings, the same or similar components are denoted by the same reference numerals.

First Embodiment

FIG. 1 is a circuit diagram illustrating a solid-state imaging device according to a first embodiment of the invention. A solid-state imaging device 1 shown in FIG. 1 includes a light receiving unit 10, a column parallel output unit 20, an amplifying unit 30, a correction unit 40, a row selecting unit 50, and a column selecting unit 60.

The light receiving unit 10 is for capturing the image of incident light and includes a plurality of pixel units P(x, y), a plurality of optical black units (hereinafter, referred to as OB units) Pob(x, y), and a plurality of optical gray units (hereinafter, referred to as OG units) Pog(x, y).

The plurality of pixel units P(x, y) is two-dimensionally arranged in the row direction and a column direction. The pixel units P(x, y) have the same structure. Each of the pixel units P(x, y) includes a photodiode that generates charge corresponding to the amount of incident light and an in-pixel amplifying unit that amplifies a voltage corresponding to the charge.

The plurality of OB units Pob(x, y) is arranged so as to surround the pixel units P(x, y) which are two-dimensionally arranged. The OB units Pob(x, y) have the same structure and the structure of the OB unit Pob(x, y) is the same as that of the pixel unit P(x, y). Each of the OB units Pob(x, y) includes a light shielding film covering the photodiode.

The plurality of OG units Pog(x, y) is arranged in the row direction such that the pixel units P(x, y) and the OB units Pob(x, y) which are arranged two-dimensionally are interposed between the OG units Pog(x, y) in the column direction. The OG units Pog(x, y) have the same structure. Each of the OG units Pog(x, y) includes the same in-pixel amplifying unit as the pixel unit P(x, y). A reference voltage is input to an input terminal of the in-pixel amplifying unit.

For example, the light receiving unit 10 having the above-mentioned structure transmits charge from the photodiode to the in-pixel amplifying unit in the pixel or transmits charge from the in-pixel amplifying unit to the column parallel output unit 20 in response to control signals (a signal Vreset(y), a signal Vtrans(y), and a signal Vshift(y) which will be described below) output from the row selecting unit 50.

The column parallel output unit 20 includes a plurality of holding units H(x) having the same structure. Among the plurality of holding units H(x), an x-th holding unit is connected to an x-th column of pixel units among the pixel units P(x, y). The holding unit H(x) sequentially receives a voltage transmitted from one row of pixel units P(x, y) connected thereto and holds the voltage value. In addition, the holding unit H(x) may hold a voltage value indicating a signal component on which a noise component is superimposed and a voltage value indicating the noise component. The holding time and reading time of the holding unit H(x) are controlled by control signals (a signal set_s(x), a signal set_n(x), and a signal Hshift(x)) output from the column selecting unit 60.

The amplifying unit 30 sequentially receives the voltage read from the column parallel output unit 20, that is, the plurality of holding units H(x) and amplifies the voltage value. In this case, the amplifying unit 30 outputs an output signal obtained by removing the noise component from the signal component to the correction unit 40.

The correction unit 40 corrects the voltage value of the output signal from the pixel unit P(x, y) on the basis of the output signal from the OB unit Pob(x, y) and the output signal from the OG unit Pog(x, y).

Next, the pixel units P(x, y), the OB units Pob(x, y), and the OG units Pog(x, y) in the light receiving unit 10, the holding units H(x) in the column parallel output unit 20, the amplifying unit 30, and the correction unit 40 will be described in detail.

Figure 2:
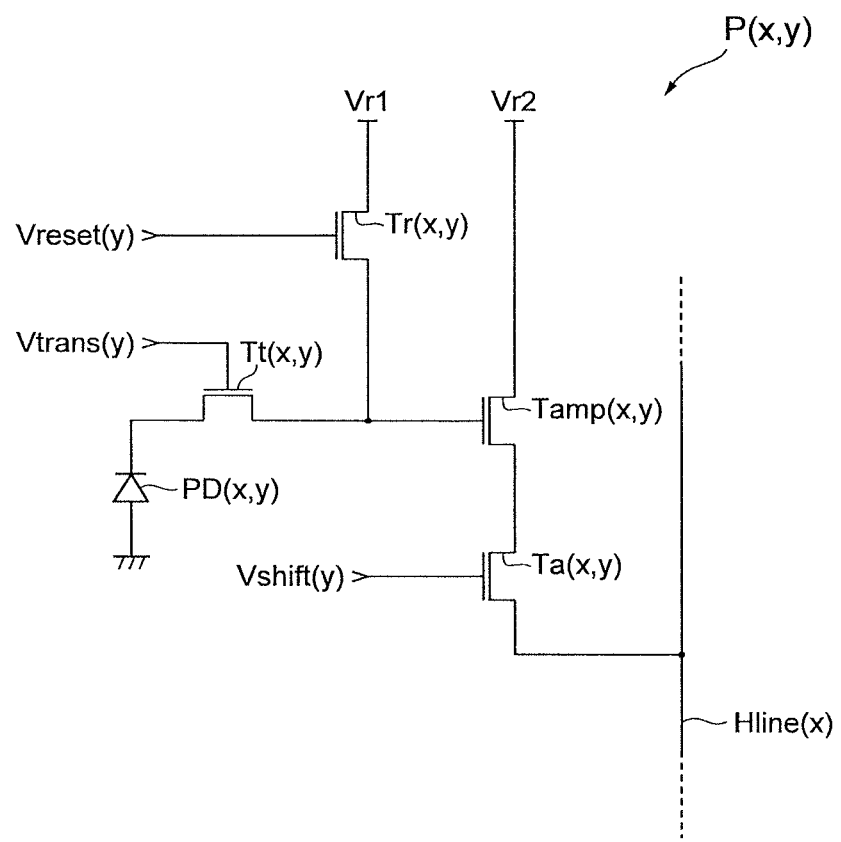
FIG. 2 is a circuit diagram illustrating a main portion of a pixel unit and an optical black unit shown in FIG. 1.

FIG. 2 is a circuit diagram illustrating the pixel unit P(x, y). FIG. 2 shows the pixel unit P(x, y) in an x-th column and a y-th row as a representative example of the plurality of pixel units P(x, y). The pixel unit P(x, y) is an APS (Active Pixel Sensor) type and includes a photodiode PD(x, y) and MOS transistors Tt(x, y), Tr(x, y), Ta(x, y), and Tamp(x, y). The transistor Tamp(x, y) is the in-pixel amplifying unit.

A reference voltage Vr1 is input to a cathode of the photodiode PD(x, y) through the in-pixel transmitting transistor Tt(x, y) and the transistor Tr(x, y) and the anode of the photodiode PD(x, y) is connected to the ground. A node between the in-pixel transmitting transistor Tt(x, y) and the transistor Tr(x, y) is connected to the gate of the amplifying transistor Tamp(x, y). The amplifying transistor Tamp(x, y) has a drain to which a reference voltage Vr2 is input and a source which is connected to a wiring line Hline(x) through the transmitting transistor Ta(x, y).

The signal Vtrans(y) is input to the gate of the transistor Tt(x, y) and the signal Vreset(y) is input to the gate of the transistor Tr(x, y). In addition, the signal Vshift(y) is input to the gate of the transistor Ta(x, y). These signals Vtrans(y), Vreset(y), and Vshift(y) are supplied from the row selecting unit 50.

When the signal Vtrans(y) is at a high level, the charge which is generated from the photodiode PD(x, y) according to the quantity of external light is transmitted to a gate capacitor (charge storage unit) of the amplifying transistor Tamp(x, y) in the pixel. When the signal Vshift(y) is at a high level, a voltage value corresponding to the amount of charge stored in the gate capacitor of the amplifying transistor Tamp(x, y) is output as a signal component to the wiring line Hline(x). In order to output the noise component from the pixel unit P(x, y) to the wiring line Hline(x), the signal Vtrans(y) may be changed to a low level and the signal Vreset(y) may be changed to a high level once to reset the voltage of the gate capacitor of the amplifying transistor Tamp(x, y). Then, the signal Vshift(y) may be changed to a high level.

When the in-pixel transmitting transistor Tt(x, y) is turned on or off with the transistor Ta(x, y) turned off, the charge stored in the photodiode PD(x, y) is transmitted to the gate capacitor of the amplifying transistor Tamp(x, y) and is then held therein. In this case, the next storage starts in the photodiode PD(x, y). In this way, an operation is performed in the global shutter mode in which the storage of charge in all pixel units starts or ends substantially at the same time.

Next, the OB unit Pob(x, y) will be described. The OB unit Pob(x, y) includes a light shielding film in addition to the components of the pixel unit P(x, y) shown in FIG. 2. For example, the light shielding film covers a photodiode PD(x, y) in the OB unit Pob(x, y). In this way, the OB unit Pob(x, y) outputs a dark signal corresponding to the dark state of the pixel unit P(x, y).

Charge generated in a region corresponding to a photodiode PD in the pixel in a general light receiving region is likely to spread to the surroundings and has an effect on the true signal of adjacent pixels. In order to prevent the influence of the charge, the OB units Pob(x, y) are provided in the periphery of the pixel units P(x, y).

Figure 3:
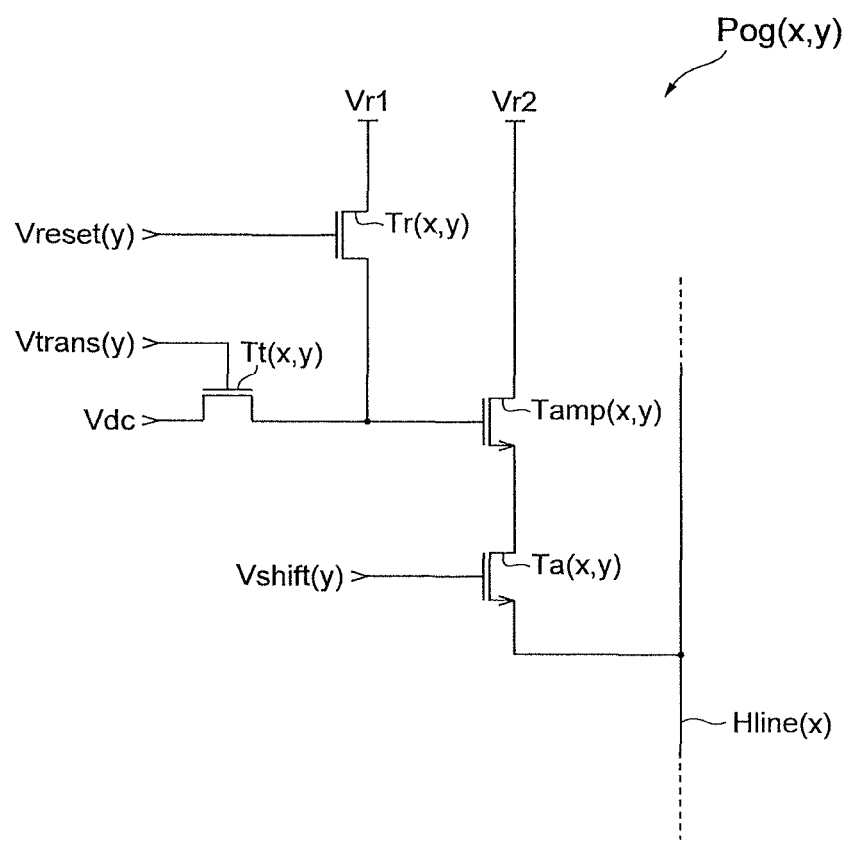
FIG. 3 is a circuit diagram illustrating an optical gray unit shown in FIG. 1.

FIG. 3 is a circuit diagram illustrating the OG unit Pog(x, y). FIG. 3 shows the OG unit in the x-th column and the y-th row as a representative example of the plurality of OG units Pog(x, y).

The OG unit Pog(x, y) does not include the photodiode PD(x, y), as compared to the pixel unit P(x, y). A constant voltage is input as the reference voltage Vdc to the OG unit Pog(x, y). The reference voltage Vdc is input to the gate of an amplifying transistor Tamp(x, y) through a transistor Tt(x, y). The value of the reference voltage Vdc is set to an intermediate level between the output value when the photodiode PD(x, y) in the pixel unit P(x, y) is in a dark state and the output value when the photodiode PD(x, y) is saturated. That is, the value of the reference voltage Vdc is set to an output value in the dynamic range of the photodiode PD(x, y) in the pixel unit P(x, y). In this way, the OG unit Pog(x, y) outputs an intermediate signal corresponding to a state in the dynamic range of the pixel unit P(x, y).

Figure 4:
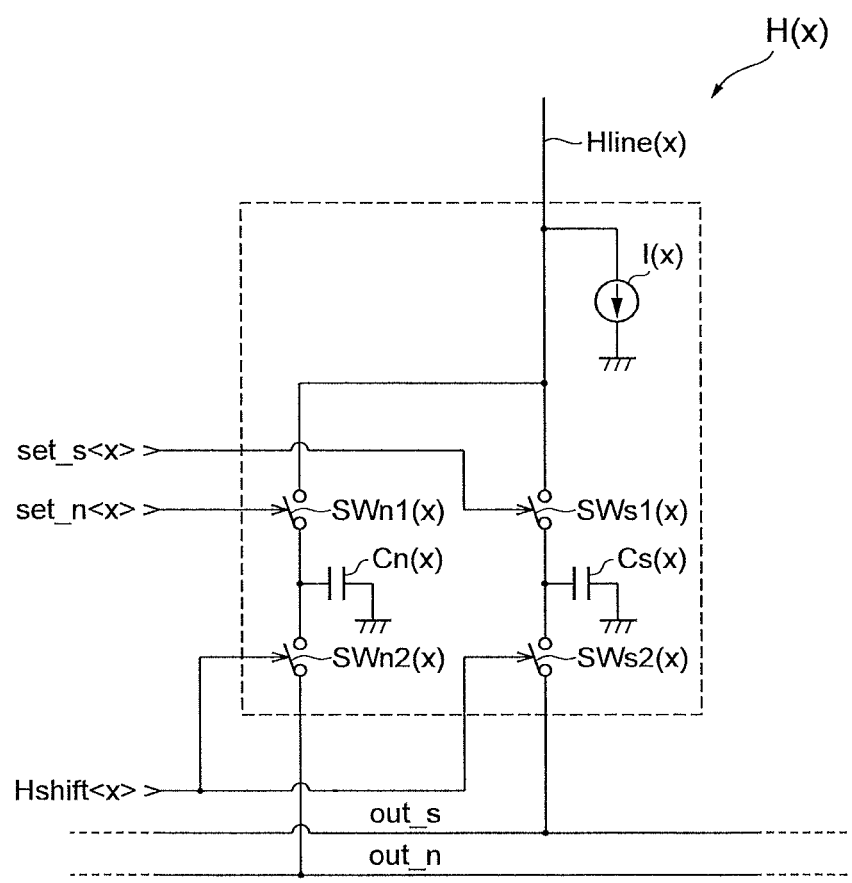
FIG. 4 is a circuit diagram illustrating a holding unit shown in FIG. 1.

FIG. 4 is a circuit diagram illustrating the holding unit H(x). FIG. 4 shows an x-th holding unit as a representative example of the plurality of holding units H(x).

The holding unit H(x) includes switches SWs1(x) and SWs2(x) and a capacitive element Cs(x) that holds signal components output from the pixel unit P(x, y), the OB unit Pob(x, y), and the OG unit Pog(x, y). In addition, the holding unit H(x) includes switches SWn1(x) and SWn2(x) and a capacitive element Cn(x) that holds noise components output from the pixel unit P(x, y), the OB unit Pob(x, y), and the OG unit Pog(x, y). The holding unit H(x) further includes a constant current source I(x).

The switch SWs1(x) and the switch SWs2(x) are connected in series to each other between the wiring line Hline(x) and a wiring line out_s. One end of the capacitive element Cs(x) is connected to the node between the switch SWs1(x) and the switch SWs2(x) and the other end thereof is connected to the ground. Similarly, the switch SWn1(x) and the switch SWn2(x) are connected in series to each other between the wiring line Hline(x) and a wiring line out_n. One end of the capacitive element Cn(x) is connected to the node between the switch SWn1(x) and the switch SWn2(x) and the other end thereof is connected to the ground.

The switch SWs1(x) is turned on or off depending on the signal set_s(x) and the switch SWn1(x) is turned on or off depending on the signal set_n(x). The switches SWs2(x) and SWn2(x) are turned on or off depending on the signal Hshift(x). The signals set_s(x), set_n(x), and Hshift(x) are supplied from the column selecting unit 60.

The constant current source I(x) is connected to the wiring line Hline(x). As such, since the constant current source I(x) is provided at the input stage of the holding unit H(x), not at the output stage of the pixel unit P(x, y), the OB unit Pob(x, y), and the OG unit Pog(x, y), a current signal is transmitted between the holding unit H(x), and the pixel unit P(x, y), the OB unit Pob(x, y), and the OG unit Pog(x, y). The deterioration of the current signal due to, for example, the capacitance of the wiring line is less than that of a voltage signal.

Therefore, according to this structure, it is possible to reduce the deterioration of the signal due to, for example, the capacitance of the wiring line Hline(x).

In the holding unit H(x), when the switch SWs1(x) is turned on or off depending on the signal set_s(x), the signal components output from the pixel unit P(x, y), the OB unit Pob(x, y), and the OG unit Pog(x, y) are stored and held by the capacitive element Cs(x). When the switch SWs2(x) is turned on in response to the Hshift(x) signal, the voltage value held by the capacitive element Cs(x) is output to the wiring line out_s. When the switch SWn1(x) is turned on or off depending on the signal set_n(x), the noise components output from the pixel unit P(x, y), the OB unit Pob(x, y), and the OG unit Pog(x, y) are stored and held by the capacitive element Cn(x). When the switch SWn2(x) is turned on in response to the signal Hshift(x), the voltage value stored in the capacitive element Cn(x) is output to the wiring line out_n.

Figure 5:
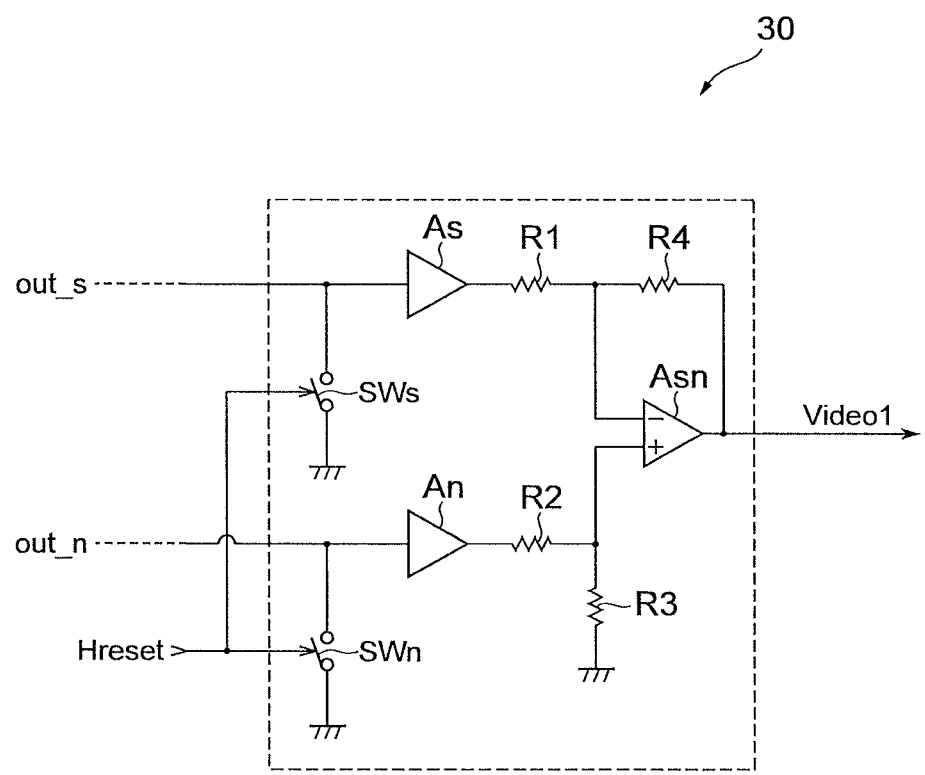
FIG. 5 is a circuit diagram illustrating an amplifying unit for output shown in FIG. 1.

FIG. 5 is a circuit diagram illustrating the amplifying unit 30. The amplifying unit 30 includes amplifiers As and An, a differential amplifier Asn, switches SWs and SWn, and resistive elements R1 to R4.

An input terminal of the amplifier As is connected to the wiring line out_s and an output terminal thereof is connected to an inverted input terminal of the differential amplifier Asn through the resistive element R1. Similarly, an input terminal of the amplifier An is connected to the wiring line out_n and an output terminal thereof is connected to a non-inverted input terminal of the differential amplifier Asn through the resistive element R2. The non-inverted input terminal of the differential amplifier Asn is connected to the ground through the resistive element R3. A voltage obtained by dividing the output signal from the amplifier An by a series circuit of the resistive elements R2 and R3 is input to the non-inverted input terminal of the differential amplifier Asn. In addition, the resistive element R4 for feedback is connected between the output terminal and the inverted input terminal of the differential amplifier Asn. The output terminal of the differential amplifier Asn is connected to a video output wiring line Video 1.

The switch SWs is connected between the input terminal of the amplifier As and the ground potential and the switch SWn is connected between the input terminal of the amplifier An and the ground potential. The switches SWs and SWn are turned on or off depending on the signal Hreset. When the switches SWs and SWn are turned on, the input terminals of the amplifiers As and An are reset.

When the switches SWs and SWn are turned off, the amplifying unit 30 receives the signal component and the noise component output from the holding unit H(x), removes the noise component using the differential amplifier Asn, and outputs the signal component.

Figure 6:
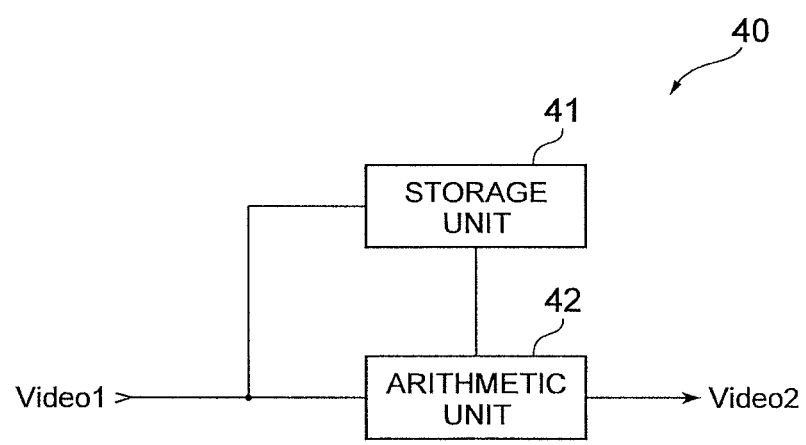
FIG. 6 is a circuit diagram illustrating a correction unit shown in FIG. 1.

FIG. 6 is a circuit diagram illustrating the correction unit 40. The correction unit 40 includes a storage unit 41 and an arithmetic unit 42. The storage unit 41 stores the value of the dark signal from the OB unit Pob(x, y) and the value of the intermediate signal from the OG unit Pog(x, y), and outputs the values to the arithmetic unit 42. The arithmetic unit 42 corrects the output value from the pixel unit P(x, y) on the basis of the value of the dark signal from the OB unit Pob(x, y) and the value of the intermediate signal from the OG unit Pog(x, y).

Figure 7:
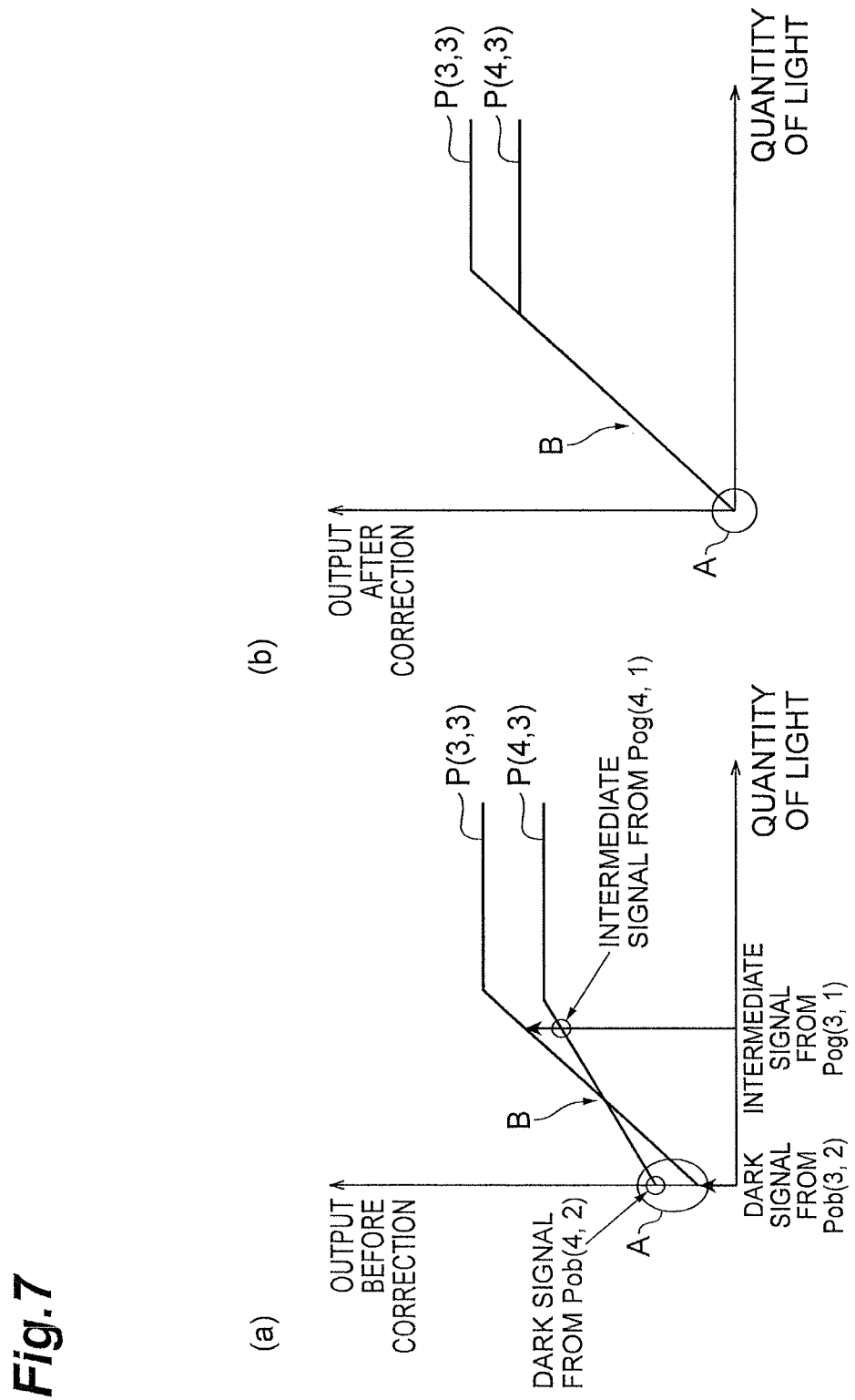
FIG. 7 is a conceptual diagram illustrating a correction process of the correction unit shown in FIG. 6.

FIG. 7 is a conceptual diagram illustrating a correction process of the correction unit 40. FIG. 7(a) shows input/output characteristics before two pixel units P(3, 3) and P(4, 3) in different columns are corrected and FIG. 7(b) shows input/output characteristics after the pixel units P(3, 3) and P(4, 3) are corrected. For example, the arithmetic unit 42 corrects the output value from the pixel unit P(3, 3) on the basis of the value of the dark signal from the OB unit Pob(3, 2) stored in the storage unit 41 such that an offset value is constant, that is, an offset value A of the input/output characteristics is constant. In addition, the arithmetic unit 42 corrects the output value from the pixel unit P(3, 3) on the basis of two values, that is, the value of the dark signal from the OB unit Pob(3, 2) and the value of the intermediate signal from the OG unit Pog(3, 1) which are stored in the storage unit 41 such that the gain is constant, that is, the gradient B of the input/output characteristics is constant. The arithmetic unit 42 corrects the output value from the pixel unit P(4, 3) on the basis of the value of the dark signal from the OB unit Pob(4, 2) stored in the storage unit 41 such that the offset value is constant, that is, the offset value A of the input/output characteristics is constant. The arithmetic unit 42 corrects the output value from the pixel unit P(4, 3) on the basis of two values, that is, the value of the dark signal from the OB unit Pob(4, 2) and the value of the intermediate signal from the OG unit Pog(4, 1) which are stored in the storage unit 41 such that the gain is constant, that is, the gradient B of the input/output characteristics is constant.

Figure 8:
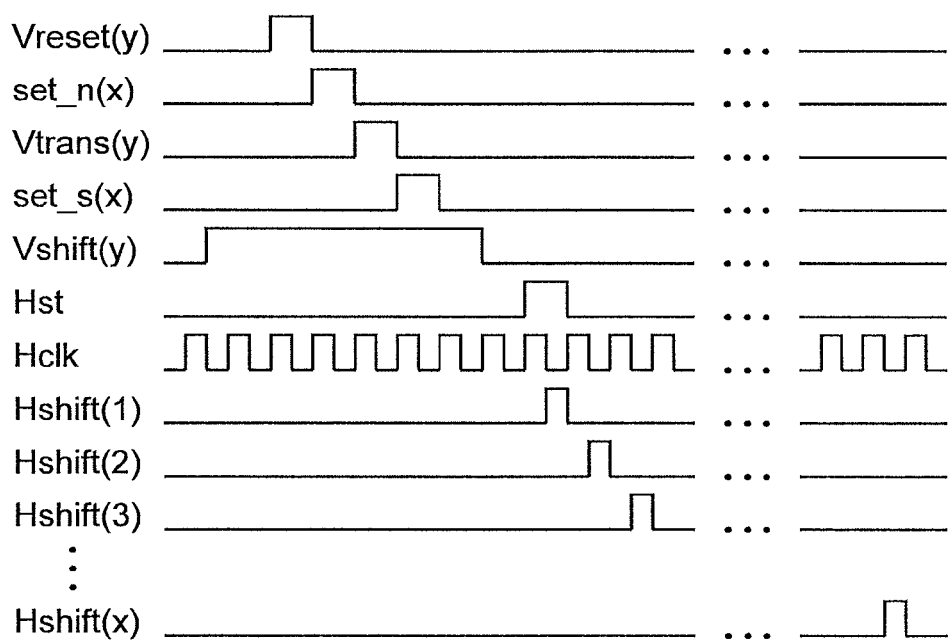
FIG. 8 is a timing chart illustrating the waveform of each signal of the solid-state imaging device shown in FIG. 1.

Next, the operation of the solid-state imaging device 1 according to this embodiment will be described. FIG. 8 is a timing chart illustrating the waveform of each signal of the solid-state imaging device 1. For example, FIG. 8 shows the waveform of each signal when a y-th row is read. This operation is sequentially repeated for each row.

As shown in FIG. 8, when the signal Vshift(y), the signal Vreset(y), and the signal set_n(x) are sequentially changed to a high level after the signal Vshift(y) is changed to a high level, the noise components from the pixel unit P(x, y), the OB unit Pob(x, y), and the OG unit Pog(x, y) in the y-th row are stored in the capacitive element Cn(x) of the holding unit H(x).

Then, when the signal Vtrans(y) is changed to a high level, the in-pixel transmission of charge from the photodiode PD(x, y) to the gate capacitor of the amplifying transistor Tamp(x, y) in the pixel unit P(x, y) and the OB unit Pob(x, y) is performed. In the OG unit Pog(x, y), the reference voltage Vdc is supplied to the gate capacitor of the amplifying transistor Tamp(x, y). Then, when the signal set_s(x) is changed to a high level, charge is transmitted from the amplifying transistors Tamp(x, y) in the pixel unit P(x, y), the OB unit Pob(x, y), and the OG unit Pog(x, y) to the capacitive element Cs(x) in the holding unit H(x). This operation is performed from the first column to an x-th column at the same time.

Then, when the signals Hshift(1) to Hshift(x) are sequentially changed to a high level, the signal components are sequentially read from the capacitive elements Cs(1) to Cs(x) of the holding units H(1) to H(x) to the amplifying unit 30 and the noise components are sequentially read from the capacitive elements Cn(1) to Cn(x) to the amplifying unit 30. Then, the amplifying unit 30 removes the noise components from the signal components and sequentially outputs the signal components.

Then, in the correction unit 40, the dark signal from the OB unit Pob(x, y) and the intermediate signal from the OG unit Pog(x, y) are stored in the storage unit 41. Then, the arithmetic unit 42 sequentially receives and corrects the output value from the pixel unit P(x, y), on the basis of the dark signal from the OB unit Pob(x, y) and the intermediate signal from the OG unit Pog(x, y) which are stored in the storage unit 41, such that the offset and gain of the output signal are constant.

As such, according to the solid-state imaging device 1 of the first embodiment, the OB unit Pob(x, y) generates the output signal of the pixel unit P(x, y) in the dark state and the OG unit Pog(x, y) generates the output signal of the pixel unit P(x, y) in the intermediate state between the dark state and the saturated state. That is, the OG unit Pog(x, y) generates an output signal in the dynamic range of the pixel unit P(x, y). At least one OB unit Pob(x, y) and at least one OG unit Pog(x, y) are disposed in each column. Therefore, for example, when reading is sequentially performed for each column, the output signal of the pixel unit P(x, y), the output signal in the dark state, and the output signal in the dynamic range are obtained from each reading operation. It is possible to correct an offset variation and a gain variation of the output signals from a plurality of pixel units P(x, y) in real time. As a result, it is possible to correct the variations in the imaging area which occurs between the columns and reduce vertical stripes which occur at the boundary between the columns of the image. That is, it is possible to improve image quality.

According to the solid-state imaging device 1 of the first embodiment, the OG unit Pog(x, y) generates an output signal in the dynamic range of the pixel unit P(x, y). Therefore, it is possible to correct the gain variation with high accuracy.

As described above, according to the solid-state imaging device 1 of the first embodiment, correction data is obtained from the OB units Pob(x, y) and the OG units Pog(x, y) arranged around the pixel units P(x, y). Therefore, the correction data is obtained at the same time as imaging is performed and it is possible to perform correction in real time. As a result, it is not necessary to capture an image in a dark state or it is not necessary to capture an image with uniform light. Therefore, it is possible to simplify an initial correction process.

Second Embodiment

Figure 9:
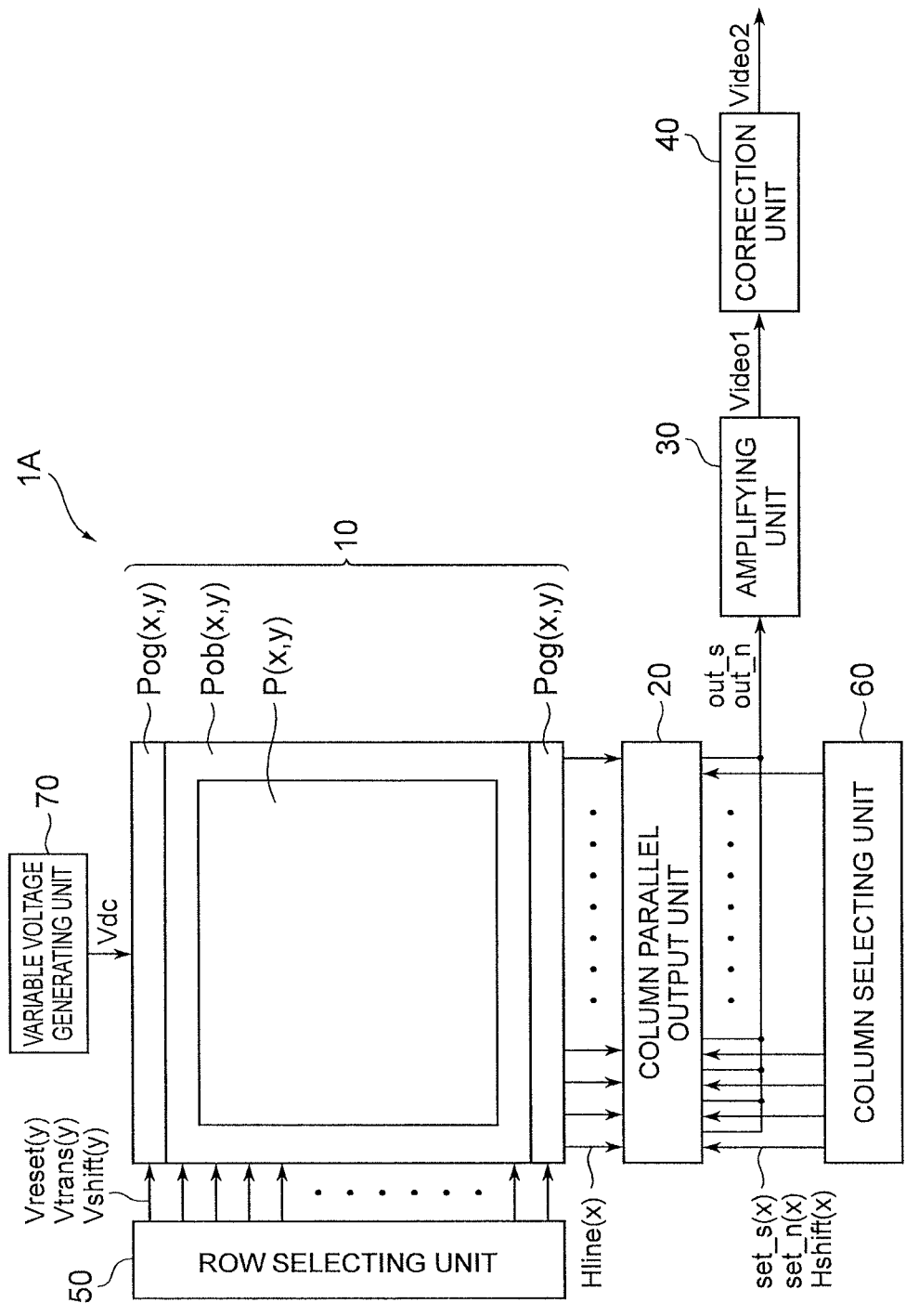
FIG. 9 is a circuit diagram illustrating a solid-state imaging device according to a second embodiment of the invention.

FIG. 9 is a circuit diagram illustrating a solid-state imaging device according to a second embodiment of the invention. A solid-state imaging device 1A shown in FIG. 9 is different from the solid-state imaging device 1 according to the first embodiment in that it further includes a variable voltage generating unit 70. The other structures of the solid-state imaging device 1A are the same as those of the solid-state imaging device 1.

Figure 10:
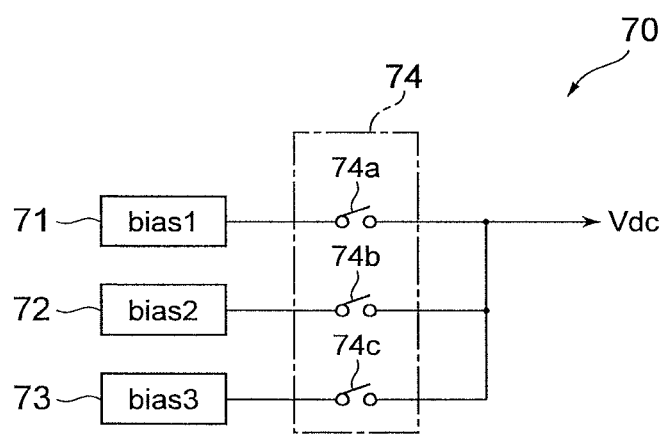
FIG. 10 is a circuit diagram illustrating a variable voltage generating unit shown in FIG. 9.

FIG. 10 is a circuit diagram illustrating the variable voltage generating unit 70. The variable voltage generating unit 70 includes, for example, three reference voltage generators 71 to 73 that generate different reference voltages and a selector 74 that sequentially outputs the output voltages from the reference voltage generating units 71 to 73 as the reference voltage Vdc. The selector 74 includes three switches 74a to 74c that are connected in series to the reference voltage generators 71 to 73, respectively. When these switches 74a to 74c are sequentially turned on, three reference voltages Vdc are supplied to the OG units Pog(x, y).

Figure 11:
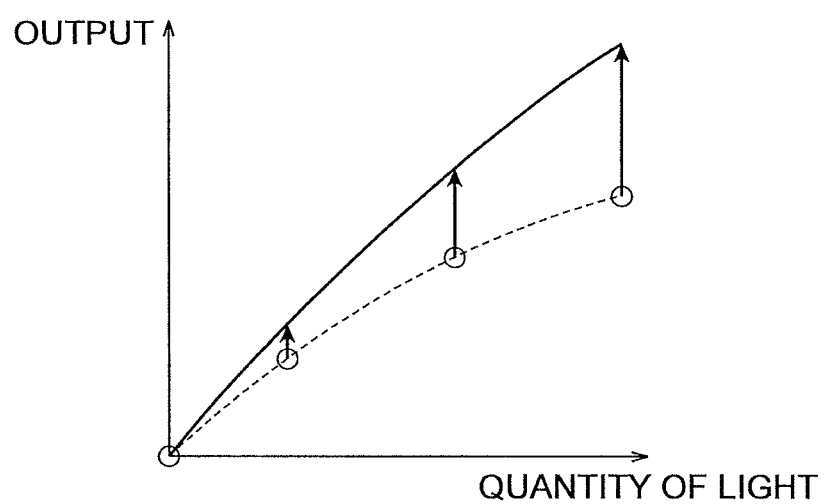
FIG. 11 is a conceptual diagram illustrating a correction process of the variable voltage generating unit shown in FIG. 10.

FIG. 11 is a conceptual diagram illustrating a correction process using the variable voltage generating unit 70. As shown in FIG. 11, the OG unit Pog(x, y) outputs three different intermediate signals in the dynamic range of the pixel unit P(x, y) on the basis of the three reference voltages Vdc which are sequentially supplied. The correction unit 40 corrects the output value of the pixel unit P(x, y) on the basis of three correction data items in the dynamic range and the correction data in the dark state from the OB unit Pob(x, y) such that the gain is constant.

As such, according to the solid-state imaging device 1A of the second embodiment, it is possible to correct a gain variation using multi-point correction values. Therefore, it is possible to correct the gain variation with high accuracy. In particular, even when the gain characteristics are non-linear, it is possible to correct the gain variation with multi-point correction values.

Third Embodiment

Figure 12:
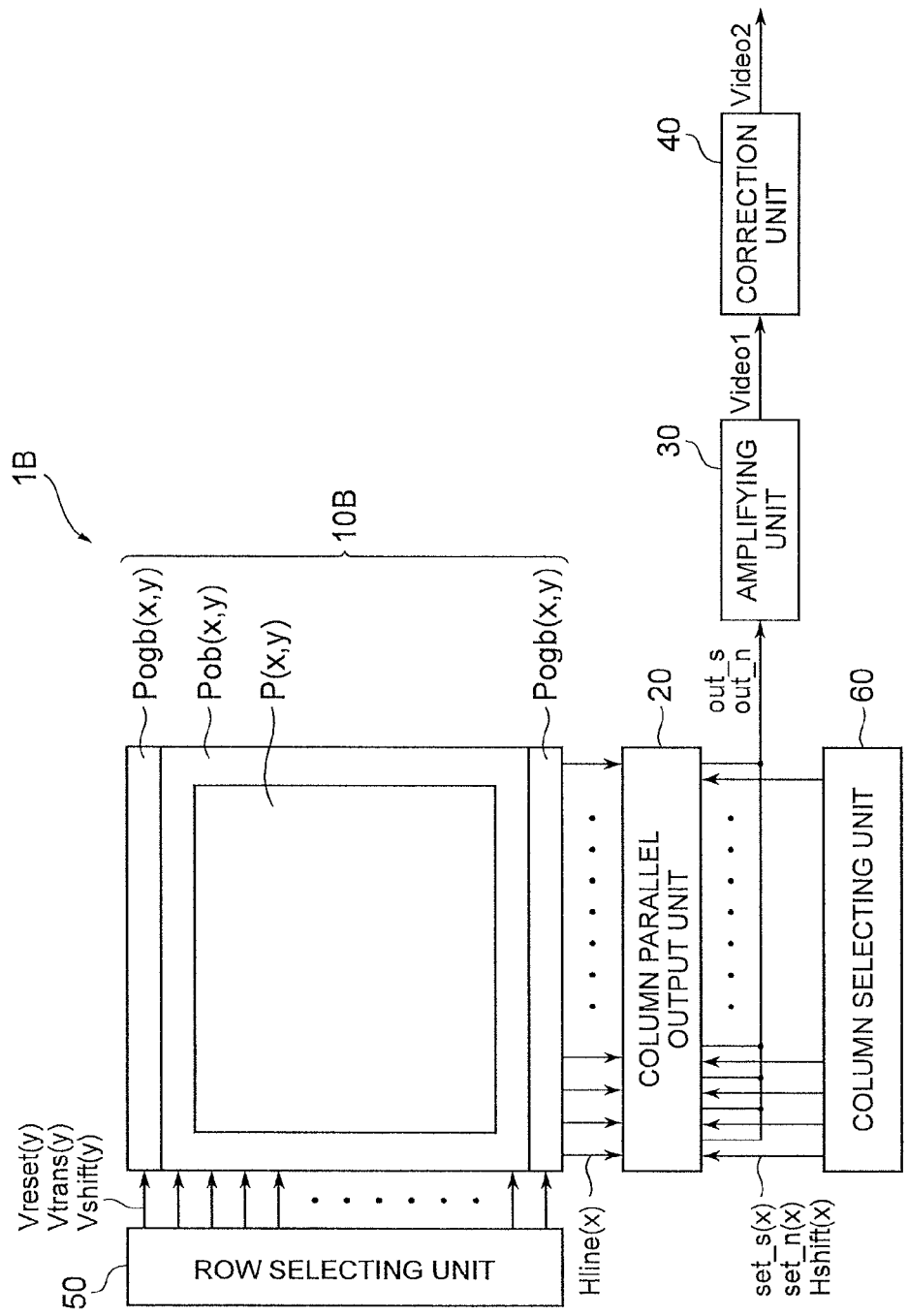
FIG. 12 is a circuit diagram illustrating a solid-state imaging device according to a third embodiment of the invention.

FIG. 12 is a circuit diagram illustrating a solid-state imaging device according to a third embodiment of the invention. A solid-state imaging device 1B shown in FIG. 12 is different from the solid-state imaging device 1 in that it includes a light receiving unit 10B instead of the light receiving unit 10. The other structures of the solid-state imaging device 1B are the same as those of the solid-state imaging device 1. The light receiving unit 10B includes a plurality of OG units Pogb(x, y) instead of the plurality of OG units Pog(x, y). The other structures of the light receiving unit 10B are the same as those of the light receiving unit 10.

Figure 13:
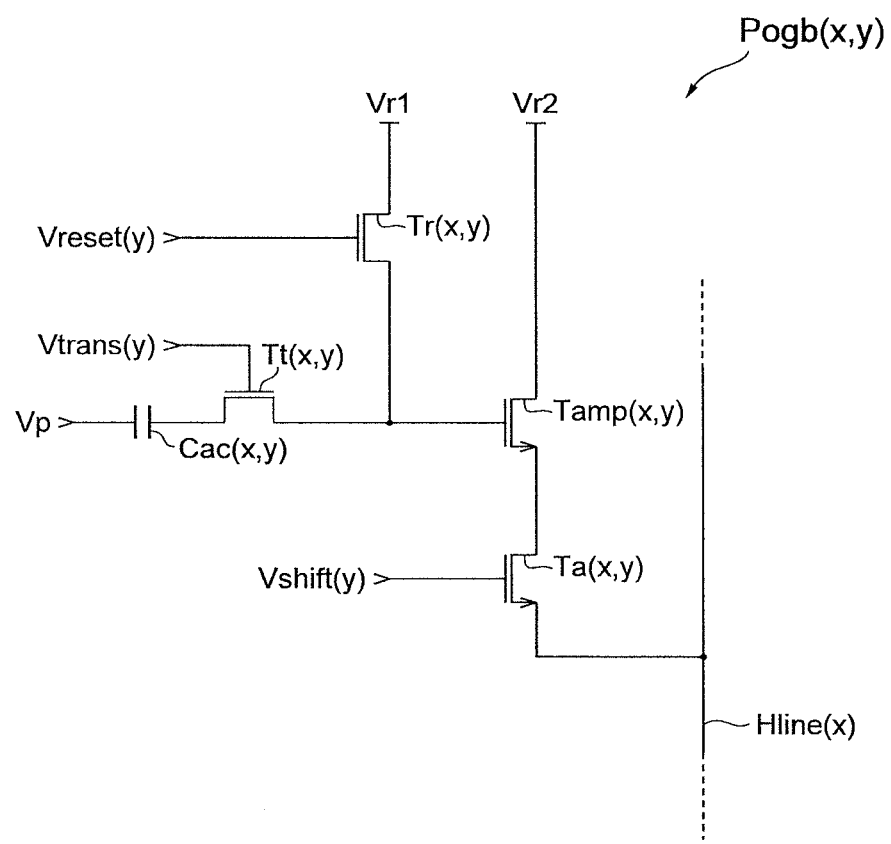
FIG. 13 is a circuit diagram illustrating an optical gray unit shown in FIG. 12.

FIG. 13 is a circuit diagram illustrating the OG unit Pogb(x, y). FIG. 13 shows the OG unit Pogb(x, y) in an x-th column and a y-th row as a representative example of the plurality of OG units Pogb(x, y). The OG unit Pogb(x, y) includes a capacitive element Cac(x, y) for AC coupling which is connected in series to the gate of an amplifying transistor Tamp (x, y) through a transistor Tt(x, y). A pulse-shaped reference voltage Vp is input to the gate of the amplifying transistor Tamp(x, y) through the capacitive element Cac(x, y) and the transistor Tt(x, y). The other structures of the OG unit Pogb(x, y) is the same as those of the OG unit Pog(x, y).

Figure 14:
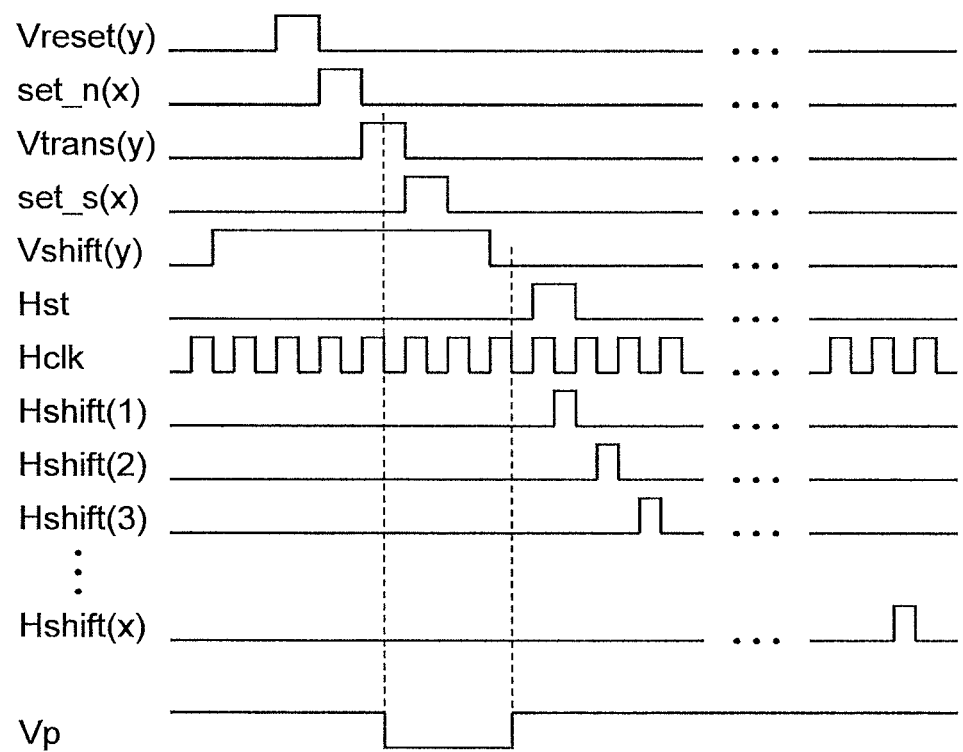
FIG. 14 is a timing chart illustrating the waveform of each signal of the solid-state imaging device shown in FIG. 12.

FIG. 14 is a timing chart illustrating the waveform of each signal of the solid-state imaging device 1B. For example, FIG. 14 shows the waveform of each signal when the y-th row is read. This operation is sequentially repeated for each row.

As shown in FIG. 14, the reference voltage Vp is a pulse voltage whose level is changed when the signal Vtrans(y) is at a high level. The level of the reference voltage Vp returns to a high level after the signal Vshift(y) returns to a low level.

In the solid-state imaging device 1B according to this embodiment, a holding unit and an amplifying unit form a CDS (Correlated Double Sampling) circuit and remove noise on the basis of a correlated double sampling method. However, in the solid-state imaging devices 1 and 1B according to the first and second embodiments, since the DC reference voltage Vdc is supplied to the OG unit Pog(x, y), it is difficult for the CDS circuit to remove noise during a reset operation.

In the solid-state imaging device 1B according to the third embodiment, the reference voltage Vp supplied to the OG unit Pogb(x, y) is a pulse voltage. For example, when the signal Vtrans(y) is at a high level, the level of the reference voltage Vp is changed to supply a pulse voltage and then a constant voltage is supplied. In this way, it is possible to remove noise during a reset operation using the CDS circuit and extract the intermediate signal in the dynamic range of the pixel unit P(x, y).

Fourth Embodiment

Figure 15:
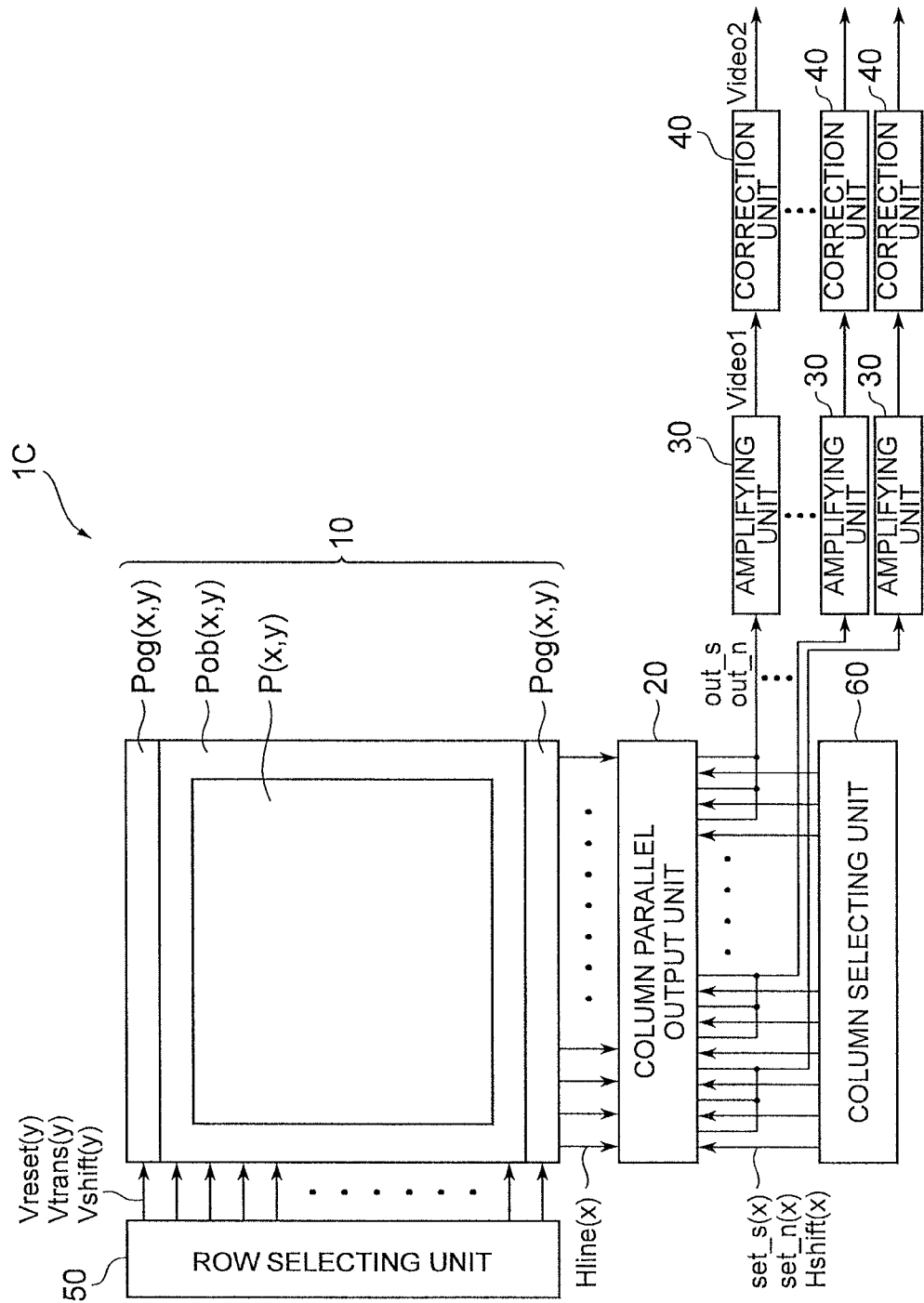
FIG. 15 is a circuit diagram illustrating a solid-state imaging device according to a fourth embodiment of the invention.

FIG. 15 is a circuit diagram illustrating a solid-state imaging device according to a fourth embodiment of the invention. A solid-state imaging device 1C shown in FIG. 15 is a multi-port readout solid-state imaging device. In the solid-state imaging device 1C, a light receiving area of x columns and y rows is divided into m blocks in the column direction. For example, FIG. 15 shows a solid-state imaging device on which one block includes three columns. The solid-state imaging device 1C includes m amplifying units 30 and m correction units 40 corresponding to the m blocks. The other structures of the solid-state imaging device 1C are the same as those of the solid-state imaging device 1.

In the solid-state imaging device 1C, the m amplifying units 30 and the m correction units 40 perform the same reading and correction processes as described above for each block substantially at the same time. In this way, it is possible to perform a reading operation at a high speed.

In the multi-port readout solid-state imaging device, vertical stripes are likely to occur at the boundary between the blocks of an image. However, according to the solid-state imaging device 1C of the fourth embodiment, the m amplifying units 30 and the m correction units 40 perform the same correction process for each block such that the offset and gain of the output signal are constant. Therefore, it is possible to correct an offset variation and a gain variation of the output signal occurring between the blocks in real time and reduce vertical stripes occurring at the boundary between the blocks of the image. That is, it is possible to improve image quality.

Fifth Embodiment

Figure 16:
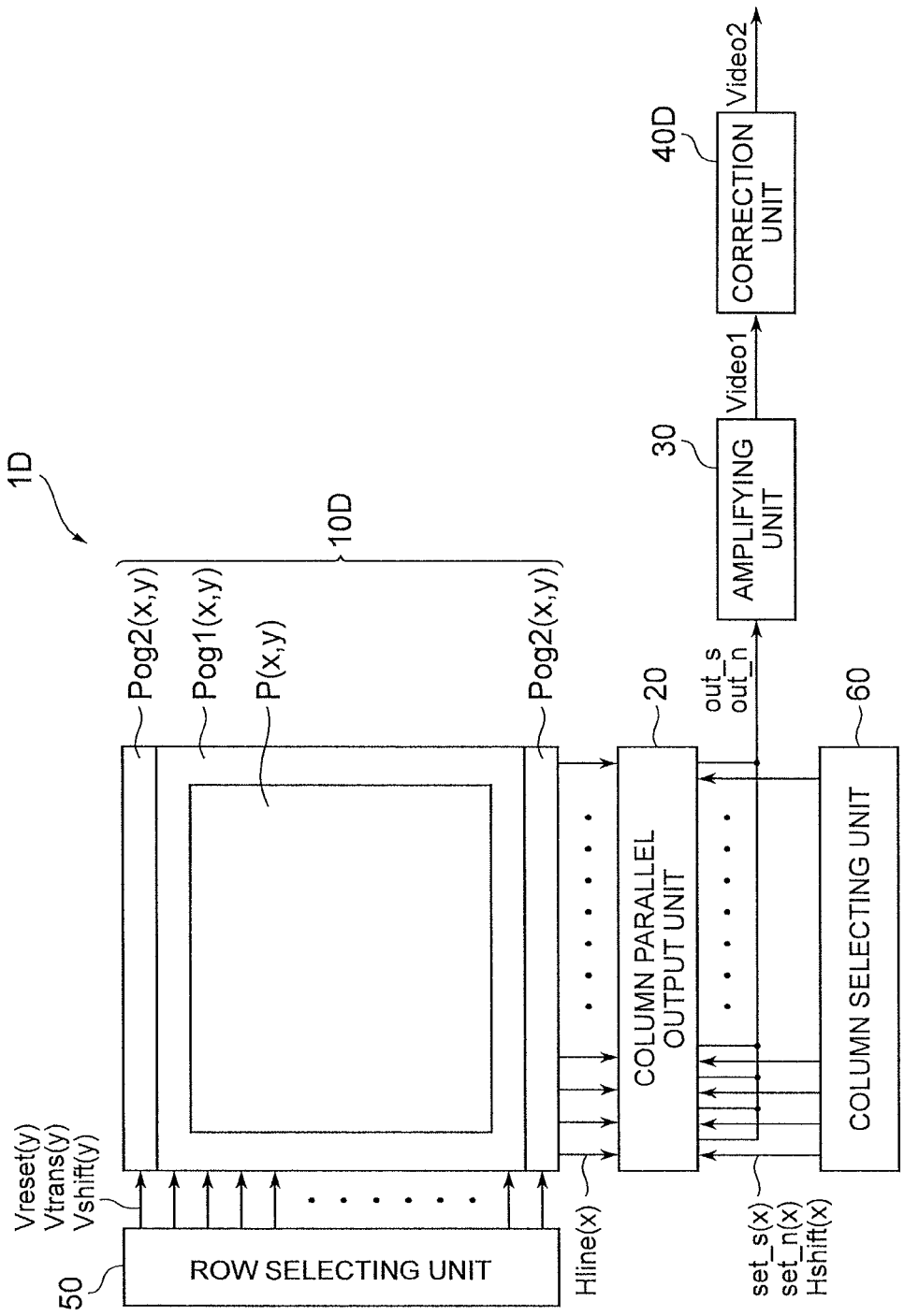
FIG. 16 is a circuit diagram illustrating a solid-state imaging device according to a fifth embodiment of the invention.

FIG. 16 is a circuit diagram illustrating a solid-state imaging device according to a fifth embodiment of the invention. A solid-state imaging device 1D shown in FIG. 16 is different from the solid-state imaging device 1 in that it includes a light receiving unit 10D and a correction unit 40D instead of the light receiving unit 10 and the correction unit 40. The other structures of the solid-state imaging device 1D are the same as those of the solid-state imaging device 1.

The light receiving unit 10D includes two rows of OG units Pog1($x, y$) and OG units Pog2($x, y$) instead of the OB units Pob(x, y) and the OG units Pog(x, y). The other structures of the light receiving unit 10D are the same as those of the light receiving unit 10. The OG unit Pog(x, y) according to the first embodiment can be applied to each of the OG unit Pog1($x, y$) and the OG unit Pog2($x, y$). Different reference voltages Vdc are supplied to the OG unit Pog1($x, y$) and the OG unit Pog2($x, y$). The value of each reference voltage Vdc is set to the intermediate level between the output value from the pixel unit P(x, y) when the photodiode PD(x, y) is in a dark state and the output value from the pixel unit P(x, y) when the photodiode PD(x, y) is saturated. That is, the value of each reference voltage Vdc is set to an output value in the dynamic range of the photodiode PD(x, y) in the pixel unit P(x, y). In this way, the OG unit Pog1($x, y$) and the OG unit Pog2($x, y$) output different intermediate signals corresponding to states in the dynamic range of the pixel unit P(x, y).

Figure 17:
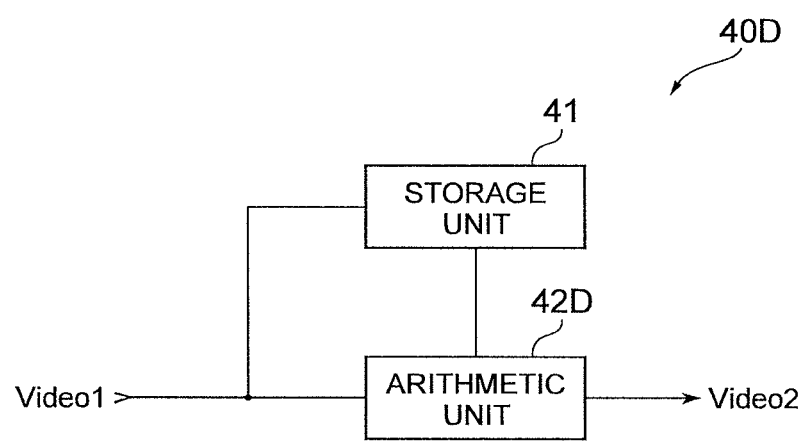
FIG. 17 is a circuit diagram illustrating a correction unit shown in FIG. 16.

FIG. 17 is a circuit diagram the correction unit 40D. The correction unit 40D includes a storage unit 41 and an arithmetic unit 42D. The storage unit 41 stores the value of the intermediate signal from the OG unit Pog1($x, y$) and the value of the intermediate signal from the OG unit Pog2($x, y$) and outputs the values to the arithmetic unit 42D. The arithmetic unit 42D corrects the output value from the pixel unit P(x, y) on the basis of the value of the intermediate signal from the OG unit Pog1($x, y$) and the value of the intermediate signal from the OG unit Pog2($x, y$).

Figure 18:
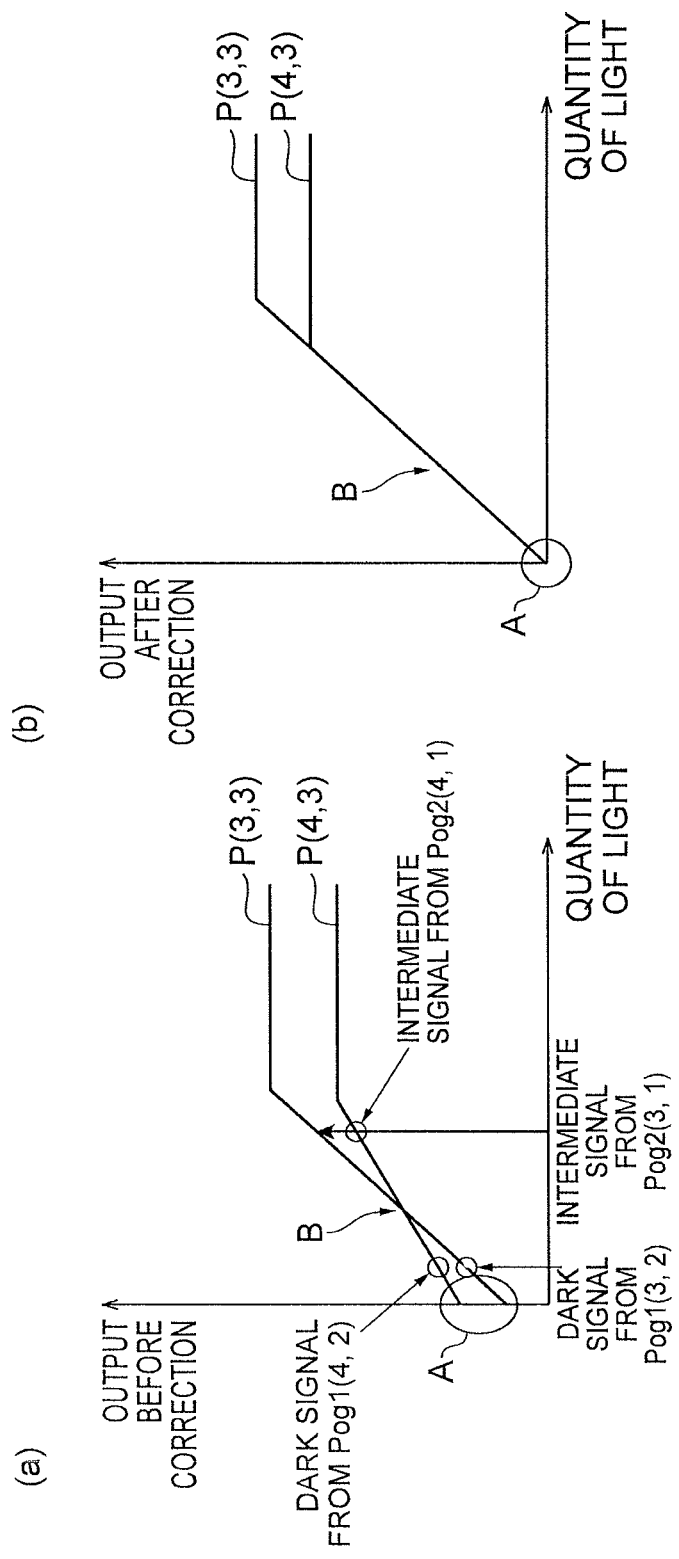
FIG. 18 is a conceptual diagram illustrating a correction process of the correction unit shown in FIG. 16.

FIG. 18 is a conceptual diagram illustrating a correction process of the correction unit 40D. FIG. 18($a$) shows input/output characteristics before two pixel units, for example, a pixel unit P(3, 3) and a pixel unit P(4, 3) in different columns are corrected and FIG. 18($b$) shows input/output characteristics after the pixel unit P(3, 3) and the pixel unit P(4, 3) are corrected. For example, the arithmetic unit 42D corrects the output value from the pixel unit P(3, 3) on the basis of two values, that is, the value of the intermediate signal from the OG unit Pog1(3, 2) and the value of the intermediate signal from the OG unit Pog2(3, 1) which are stored in the storage unit 41 such that the offset value is constant, that is, the offset value A of the input/output characteristics is constant and the gain is constant, that is, the gradient B of the input/output characteristics is constant. In addition, the arithmetic unit 42D corrects the output value from the pixel unit P(4, 3) on the basis of two values, that is, the value of the intermediate signal from the OG unit Pog1(4, 2) and the value of the intermediate signal from the OG unit Pog2(4, 1) which are stored in the storage unit 41 such that the offset value is constant, that is, the offset value A of the input/output characteristics is constant and the gain is constant, that is, the gradient B of the input/output characteristics is constant.

As such, according to the solid-state imaging device 1D of the fifth embodiment, the OG unit Pog1($x$, $y$) and the OG unit Pog2($x$, $y$) generate two different output signals of the pixel unit P(x, y) in the intermediate state between the dark state and the saturated state. That is, the OG unit Pog1($x$, $y$) and the OG unit Pog2($x$, $y$) generate two output signals in the dynamic range of the pixel unit P(x, y). Two OG units Pog1($x$, $y$) and Pog2($x$, $y$) are disposed for each column. Therefore, for example, when a reading operation is sequentially performed for each column, the output signal from the pixel unit P(x, y) and two output signals in the dynamic range are obtained by each reading operation. Therefore, it is possible to correct an offset variation and a gain variation of the output signals from a plurality of pixel units P(x, y) in real time. As a result, in the solid-state imaging device 1D according to the fifth embodiment, similarly to the solid-state imaging device 1 according to the first embodiment, it is possible to correct these variations in the imaging area which occur between the columns and reduce vertical stripes occurring at the boundary between the columns of an image. That is, it is possible to improve image quality.

In the solid-state imaging device 1D according to the fifth embodiment, the OG unit Pog1($x$, $y$) and the OG unit Pog2($x$, $y$) generate output signals in the dynamic range of the pixel unit P(x, y). Therefore, it is possible to correct the gain variation with high accuracy.

In the fifth embodiment, two rows of OG units supplied with different reference voltages are provided. However, three or more rows of OG units supplied with different reference voltages may be provided. In this case, the correction unit 40D corrects the output value from the pixel unit P(x, y) using the values of the intermediate signals from the three or more OG units.

Similarly to the variable voltage generating unit 70 according to the second embodiment, the fifth embodiment may further include a variable voltage generating unit that generates different reference voltages and selectively outputs two of the reference voltages to the OG unit Pog1($x$, $y$) and the OG unit Pog2($x$, $y$).

In the fifth embodiment, the OG unit Pogb(x, y) according to the third embodiment may be used as the OG unit Pog1($x$, $y$) and the OG unit Pog2($x$, $y$). In this case, different pulse-shaped reference voltages Vp are supplied to the OG unit Pog1($x$, $y$) and the OG unit Pog2($x$, $y$).

The fifth embodiment may provide a multi-port readout solid-state imaging device in which a light receiving area of x columns by y rows is divided into m blocks in the column direction and m amplifying units 30 and m correction units 40D are provided so as to correspond to the m blocks, similarly to the fourth embodiment.

The invention is not limited to this embodiment, but various modifications can be made. For example, the arrangement positions of the OG units Pog(x, y), Pogb(x, y), Pog1($x$, $y$), and Pog2($x$, $y$), and the OB units Pob(x, y) in the imaging area are not limited to this embodiment. For example, as described in the first embodiment, the OG units Pog(x, y) and Pogb(x, y) are arranged outside the OB units Pob(x, y). However, the OB units Pob(x, y) may be arranged outside the OG units Pog(x, y) and Pogb(x, y). In this embodiment, the OB units Pob(x, y) are arranged so as to surround the pixel units P(x, y). However, at least one column of OB units Pob(x, y) may be provided in the imaging area. In this embodiment, the OG units Pog(x, y) and Pogb(x, y) are arranged so as to have the pixel units P(x, y) and the OB units Pob(x, y) interposed therebetween. However, at least one column of OG units Pog(x, y) and Pogb(x, y) may be arranged in imaging area.

In this embodiment, the storage unit 41 of the correction unit 40 or 40D stores the dark signal from the OB unit Pob(x, y) and the intermediate signals from the OG units Pog(x, y), Pogb(x, y), Pog1($x$, $y$), and Pog2($x$, $y$) whenever the signals are input thereto and outputs the latest correction data to the arithmetic unit 42 or 42D. However, the storage unit 41 may not store the dark signal and the intermediate signals whenever the signals are input thereto. Since the offset variation and the gain variation of the output signals are not always generated, the storage unit 41 may store the dark signal and the intermediate signal every time at a given time interval. The storage unit 41 may accumulatively store the dark signal and the intermediate signals, and switch and output the latest correction data at a given time interval. As such, when all of OB unit data, OG unit data, and image data are stored, it is possible to correct the data later.

In the second embodiment, the variable voltage generating unit 70 changes the reference voltage Vdc input to the OG unit Pog(x, y). However, a method of changing the reference voltage Vdc input to the OG unit Pog(x, y) is not limited to the second embodiment. For example, an external connection terminal may be provided, the reference voltage Vdc may be supplied from the outside to the OG unit Pog(x, y) using the external connection terminal, and the reference voltage Vdc supplied from the outside may be changed.

In the fourth embodiment, the m amplifying units 30 and the m correction units 40 are provided so as to correspond to the m blocks in the imaging area (multi-port readout type). However, x amplifying units 30 and x correction units 40 may be provided so as to correspond to x columns (complete column parallel readout type). The fifth embodiment may provide a complete column parallel readout type in which x amplifying units 30 and x correction units 40 are provided so as to correspond to x columns.

In this embodiment, the column parallel output unit 20 is the analog holding unit H(x). However, the column parallel output unit 20 may be a digital column ADC. According to this structure, it is possible to correct a non-negligible variation between the columns of the column ADC.

INDUSTRIAL APPLICABILITY

The invention can be applied to correct an offset variation and a gain variation of the output signals in an imaging area of a solid-state imaging device in real time.

REFERENCE SIGNS LIST 1, 1A, 1B, 1C: SOLID-STATE IMAGING DEVICE
10, 10B: LIGHT RECEIVING UNIT
P(x, y): PIXEL UNIT
Pob(x, y): OPTICAL BLACK UNIT (OB UNIT)
Pog(x, y), Pogb(x, y), Pog1($x$, $y$), Pog2($x$, $y$): OPTICAL GRAY UNIT (OG UNIT)
PD(x, y): PHOTODIODE (PHOTOELECTRIC CONVERSION ELEMENT)
Tr(x, y): TRANSISTOR
Tt(x, y): IN-PIXEL TRANSMITTING TRANSISTOR Tamp(x, y): AMPLIFYING TRANSISTOR (AMPLIFYING UNIT FOR PIXEL UNIT, IN-PIXEL AMPLIFYING UNIT)
Ta(x, y): TRANSMITTING TRANSISTOR
Cac(x, y): CAPACITIVE ELEMENT
20: COLUMN PARALLEL OUTPUT UNIT
H(x): HOLDING UNIT
Cn(x), Cs(x): CAPACITIVE ELEMENT
SWn1(x), SWn2(x): SWITCH
SWs1(x), SWs2(x): SWITCH
I(x): CONSTANT CURRENT SOURCE
30: AMPLIFYING UNIT
As, An: AMPLIFIER
Asn: DIFFERENTIAL AMPLIFIER
R1 to R4: RESISTIVE ELEMENT
SWs, SWn: SWITCH
40: CORRECTION UNIT
41: STORAGE UNIT
42: ARITHMETIC UNIT
50: ROW SELECTING UNIT
60: COLUMN SELECTING UNIT
70: VARIABLE VOLTAGE GENERATING UNIT
71 TO 73: REFERENCE VOLTAGE GENERATOR
74: SELECTOR
74a TO 74c: SWITCH

The invention claimed is:

1. A solid state imaging device comprising:

a plurality of pixel units, each pixel unit including a photoelectric conversion element and an amplifying unit that amplifies an output signal from the photoelectric conversion element, the plurality of pixel units being two dimensionally arranged;

at least one row of optical black units, each optical black unit including a photoelectric conversion element, an amplifying unit, and a light shielding film that covers the photoelectric conversion element of the optical black unit, the photoelectric conversion element and the amplifying unit of the optical black unit having the same structure as the photoelectric conversion element and the amplifying unit of the pixel unit, at least one row of optical gray units, each optical gray unit including an amplifying unit to which a reference voltage is input, the amplifying unit of the optical gray unit having the same structure as the amplifying unit of the pixel unit; and a correction circuit that corrects an output signal from one of the plurality of pixel units based on an output signal from at least one of the optical black units and an output signal from at least one of the optical gray units, wherein a value of the reference voltage is less than a value of the output signal from the photoelectric conversion element of the pixel unit in a saturated state, and wherein each of the optical gray units include a capacitive element that is connected in series between the reference voltage and an input terminal of the amplifying unit of the optical gray unit, the reference voltage being a pulse voltage.

* * * * *